Jan. 25, 1955  J. J. TOWNSEND  2,700,629
METHOD FOR TRANSFERRING A DECORATION TO A SURFACE
Filed Jan. 30, 1950  2 Sheets-Sheet 1
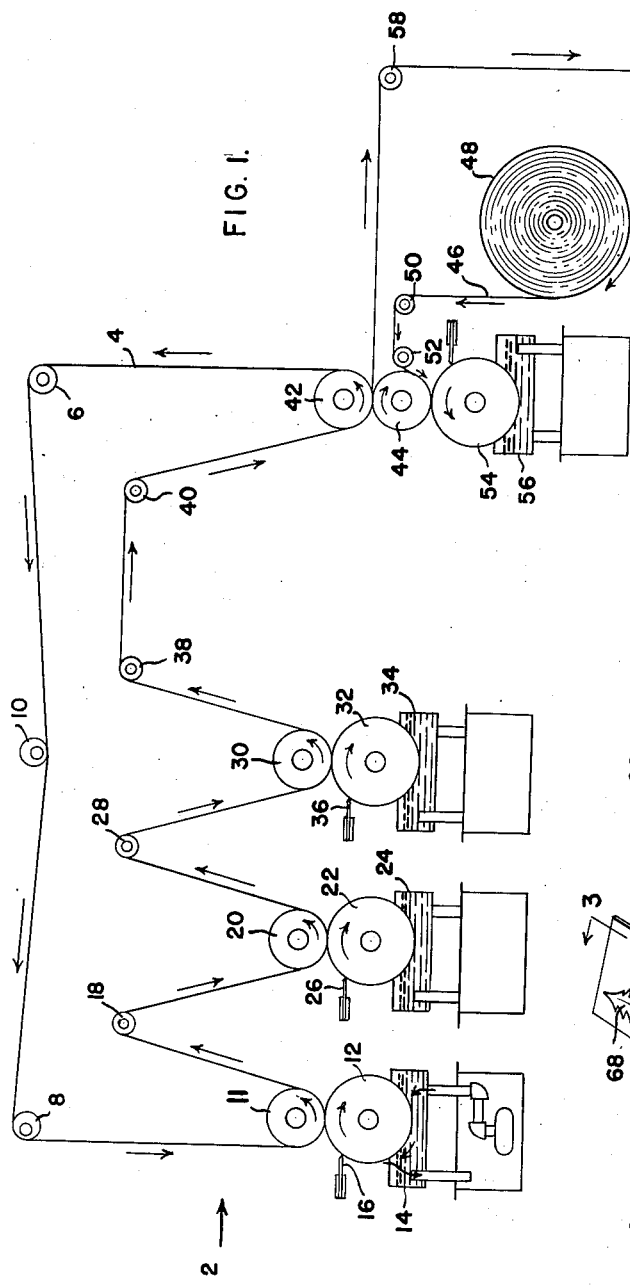
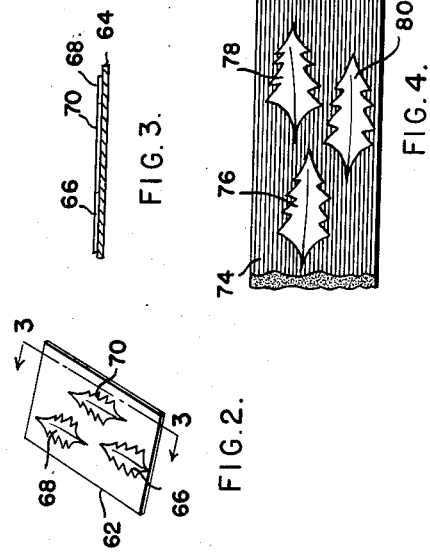
INVENTOR.
JOHN J. TOWNSEND, Jr
BY
ATTORNEYS

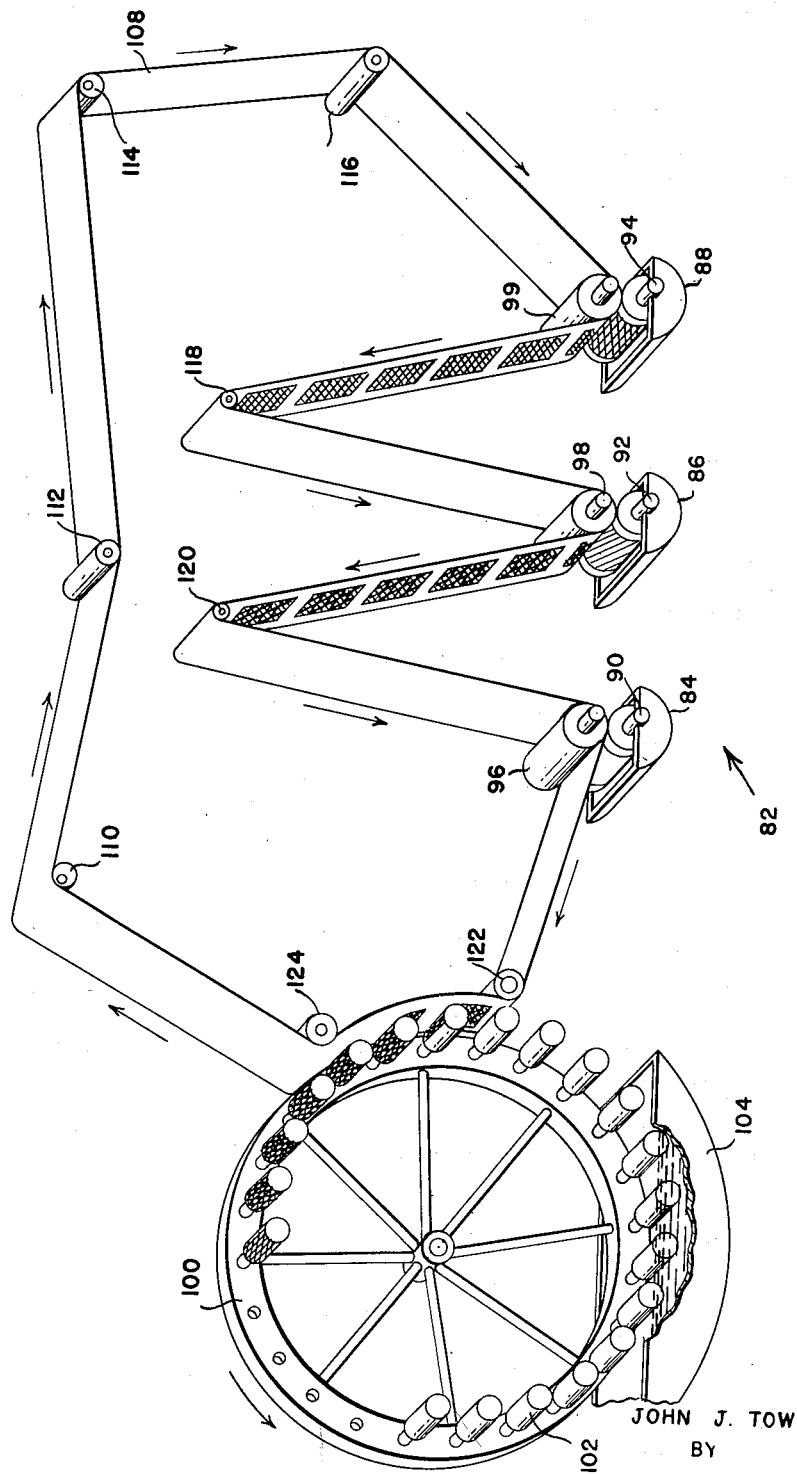

2,700,629

METHOD FOR TRANSFERRING A DECORATION TO A SURFACE

John J. Townsend, Camden, N. J., assignor to American Photofoil Corporation, Philadelphia, Pa., a corporation of Pennsylvania Application January 30, 1950, Serial No. 141,174

2 Claims. (Cl. 154—95)

This invention relates to the art of finishing. More particularly, it relates to a transfer by means of which a surface can be decorated and a method for effecting transfer operations.

The art relating to transfers is very extensive. Numerous transfer devices and transfer methods have been used extensive heretofore. For example, it has been common to mount the transfer decoration either as a film of lithographic ink, or of lacquer bearing a design, or as a film of lacquer and enamel bearing a design upon a gummed sheet of paper. The exposed face of the transfer film is then coated with a suitable water-soluble adhesive and upon soaking the transfer with water, the transfer film may be applied to a suitable surface and stripped from the gummed paper. Upon the evaporation of the moisture from the adhesive, the transfer design is fixed in place.

Again, it is well known to build up the transfer decoration in the form of a film of lacquer upon gummed paper. The gum used is water-soluble and on soaking the paper with water, the transfer film may be slid off the paper and onto the surface to be decorated, the gum remaining on the transfer and uniting it to the surface.

Another method of applying transfer films to a surface involves the use of a suitable precoating placed on the surface. A suitable solvent, such as ethyl lactate, is applied to the surface to be decorated in sufficient quantity to soften and render it tacky. The film may then be applied to the thus coated surface, the tacky condition fostered by the solvent effecting a union therebetween. The solvent is then vaporized, leaving the transfer film cemented to the surface. Again, a similar result may be achieved by using a quick drying varnish, enamel or the like to unite a transfer film to a surface to be decorated. Here, the varnish is allowed to dry until the desired degree of tackiness is attained.

All of the above discussed means for decorating a surface through a transfer have been found to be relative unsatisfactory, particularly from the point of view of mass production. Where, as discussed above, water-soluble adhesives are used, there are two difficulties. In the first place, these adhesives do not adhere or set rapidly enough. Further, they do not form an adequately secure bond for most purposes, particularly since they are subject to future weakening incident to coming into contact with moisture.

When a solvent or a quick drying varnish or the like is used as discussed above, considerable difficulty is experienced in controlling satisfactorily the degree of tackiness requisite for proper adhesion. Again, the bond formed is not adequately strong. Here also, as in the case of the water-soluble adhesives, the decoration of the surface is accomplished only by means of adding a thick layer.

Thermoplastic sheetings, as the vinyl compounds, for example, do not respond well to conventional printing compositions used for paper and textiles. When color compositions are used that will print upon such materials, the amount applied, with its accompanying solvent to produce even color is often so great as to actually cause the printed surface to swell, often distorting it before additional color may be printed and, in many instances, precluding the use of fine detail tones and lines.

Further, the plasticizers or other agents contained in such thermoplastic materials to give them flexibility and draping qualities cause such materials to be subject to stretching, wrinkling and other distortions when placed under relatively mild stressing and handling such as is encountered in continuous web, or even sheet-fed, printing, making it difficult or virtually impossible to hold the very fine register required in the best multi-color tone, half-tone, and line printing.

In order to obviate the above outlined difficulties and others that are obvious, the art developed the use of substances which were compatible with the surfaces to be decorated, and printed these compatible substances on a sheet of incompatible material, the transfer of the compatible substances to the surface to be decorated being effected through the medium of heat. For example, the decoration of cellulose acetate through the use of a transfer comprising a web of polished styrene, having printed thereon an alcohol or water soluble dye, dissolved in a solvent mixture of an adhesive resin such as polyvinyl acetate is known to the art.

Again, another means to effect a transfer is to coat a paper sheet with an impervious alkyd resin coating, print an ink compatible with the surface to be decorated on the alkyd resin surface, and coat the ink with an organisol solution. The solvent diluent system of the organisol solution is then evaporated and the remaining residue is heat fluxed to form a sheet. Such a transfer is limited to sheets of about .004" to .006" thick and does not produce fine detail due to imperviousness of the alkyd resin layer.

By way of further illustration, it is known in the art to form a transfer with a copolymer of vinyl acetate and vinyl chloride which is dissolved in acetone to form a 10% solution of the copolymer by weight. A plasticizer comprising triethylene glycol di-2-ethylbutyrate is added to the extent of 10% of the plasticizer based on the dry weight of the copolymer. The solution thus formed is cast onto a sheet of regenerated cellulose such as, for example, cellophane to form the transfer. The resin copolymer may contain a suitable pigment or dyestuff to impart color to the transfer.

The transfer operation in this case is affected by bringing the article to be finished into contact with the film on the backing sheet and applying heat to the film and/or the article and sufficient pressure to force the film into contact with the article and cause it to adhere thereto. The backing sheet is then stripped from the film after cooling.

These improved transfers are still comparatively imperfect since they must be carried out at high temperatures. This results in distortion due to flow of the surface to be decorated and the transfer sheet. Further chemical breakdown frequently results. Further, if originally properly adhered to the transfer sheet, the decorative medium is hard to part from the transfer sheet.

Other pertinent aspects of the prior art should be noted. The use of a cellulose acetate sheet carrying a design on its inner face, bonding such a sheet to a compatible surface and then exfoliating the major upper portion of the sheet is common. This method is very limited as to materials and is unreliable in operation, particularly where a continuous process is employed.

With respect to glass surfaces, the prior art teaches the use of a film of collodion on which a design is printed with an ink containing a vitrifiable base which will carry the pigment portion of the base with it. The collodion film is then secured by an additional adhesive to the object to be decorated and the whole is then subjected to firing at an elevated temperature. The collodion film is volatilized and consumed, leaving the design originally printed thoroughly incorporated into the body being decorated.

Illustrative of still another means for transferring a decorative design to a surface is the printing of a design produced by photochemical reproduction on a transfer sheet comprising a paper backing having a layer of a plastic, adhesive coated on its face. Full tone and half-tone coloring matter is then applied to the transfer sheet and the sheet adhesively attached to the material to be decorated. A dye solvent is then applied to release the dye and cause it to penetrate into the material. The transfer sheet is then stripped off.

With particular respect to the transfer of metal substrates for decorating surfaces, it is old to use a paper sheet impregnated with glycerin and other hydroscopic materials. From such a transfer sheet such materials as gold or silver leaf may readily be transferred to a surface to be decorated. Also, thin films of regenerated cellulose or cellulose acetate have been produced carrying metal substrates for transfer purposes, a thin layer of wax-like material being sandwiched between such film and substrate to produce a means of parting between said two members during transfer.

Molded and laminated thermosetting plastic materials have been decorated via transfer during their molding or laminating cycle by means of a suitable paint or lacquer material having first been applied to the surface of the mold and permitted to dry thereon then charging the mold further with the final material to be molded and subsequently curing the whole under suitable heat and pressure.

Finally with reference to the prior art, it has heretofore been common to decorate a thin plastic film, which is compatible with the surface to be decorated, and then with heat and pressure unite this film with the surface to be decorated, the decorated face of the film being placed against the surface being decorated.

The above discussion of the prior art highlights the problems which have heretofore remained unsolved and which applicant by his invention has solved. Generally speaking, it will be particularly apparent that in following the teachings of the prior art in order to achieve detailed designs on a mass production basis, one must accept either decorative coatings of undesirable thickness and by comparison insecurely adhered to the surface decorated or, on the other hand, utilize very high temperatures and transfer the decorative design through the medium of the fluidity and tackiness of a matrix carrying the design. The latter method represents the best approach to the solution of the problem by the prior art. In view of the fact that the matrix or carrier of the coloring material is itself rendered highly fluid in order to effect the transfer and that both the carrier sheet and surface to be decorated are somewhat softened, it will be apparent that the result will be that there will be considerable so called wandering of the design during the transfer operation.

By way of contrast, the transfer of this invention while carrying the decorating medium in a matrix resin has in addition a flow agent in solution with the matrix resin which promotes the flow of the matrix resin by, in effect, reducing its viscosity and acts as a parting agent with respect to the transfer sheet. The flow agent further assists in bonding the matrix resin to the compatible surface to be decorated.

The flow agent permits the use of a solvent which is less active with respect to the matrix resin and the surface to be decorated than heretofore possible.

The use of the flow agent results in a transfer capable of effecting decoration with far greater accuracy and detail. Further greater speed of transfer is achieved and this represents a large step forward with respect to continuous mass production methods.

It is an object of this invention to provide a transfer having superior characteristics for decorating surfaces.

It is a further object of this invention to provide a transfer by means of which a surface may be decorated with a high degree of fineness, detail of tone, half-tone, and line or plane geometric patterns in a single or multiplicity of colors.

A further object of this invention is to provide a transfer which is susceptible to being used at a high rate of speed in conventional mass production methods.

A still further object of this invention is to provide a transfer which can provide a surface to be decorated with a strongly adhering decoration and which does not add any material thickness to the surface being decorated.

An additional object of this invention is to provide a transfer which can be used to decorate a surface through the medium of a solvent and yet provide fineness, great detail and good register with respect to the design involved.

An additional object of this invention is to provide a transfer which will place a design of great fineness of detail and of good register on a flexible soft thermoplastic material, on a textile sized with a flexible soft thermoplastic material and other materials of a similar nature which cannot be practically decorated in a like manner by direct printing means.

An additional object of this invention is to provide a transfer suitable for the decoration of soft flexible thermoplastic materials and the like which, due to their inherent nature, tend to stretch, wrinkle, swell or otherwise become deformed.

It is an additional object of this invention to provide a transfer which is particularly suitable for use in connection with the decoration of glass and metal surfaces and which may be further treated to form a hard vitreous body integral with such surfaces.

It is still a further object of this invention to provide novel methods whereby a transfer operation in accordance with this invention may be effected.

It is a still further object of this invention to provide a novel method for effecting a transfer operation on a normally impervious surface which is incompatible with the portion of the transfer which it is desired to adhere to it.

These and other objects of this invention will become apparent on reading the following description and claims and the drawings in which:

Figure 1 is a schematic showing of apparatus utilizing a continuous web to carry out the method in accordance with this invention;

Figure 2 is a perspective view of a transfer device in accordance with this invention;

Figure 3 is a section taken on the plane indicated by the line 3—3 in Figure 2;

Figure 4 is a plan view of a metal substrate transfer device in accordance with this invention;

Figure 5 is a side elevation of the transfer device of Figure 4; and

Figure 6 is a schematic showing of apparatus having utility in applying the method of this invention to glass bottles.

A transfer in accordance with this invention comprises a firm flexible substantially unstretchable, except as otherwise noted, transfer sheet, a decorative medium dispersed in a matrix resin which is either only slightly compatible with the transfer sheet or not compatible at all and which is highly compatible with the surface to be decorated. The matrix resin which carries the decorative medium is miscible with a flow agent which has a lower temperature of flow than the matrix resin and which is more readily effected by solvents.

The term "carrier sheet" is used herein interchangeably with the term "transfer sheet" the meaning of the terms being synonymous in the art.

The transfer of the decoration may be effected through the medium of a suitable solvent.

The decorating or graphic medium may be drawn widely from among the many well known pigments and dyes commonly used in the art. Such must, of course, be sufficiently stable for use under elevated thermal conditions to which they are subjected. Individual colors are selected also for their stability toward a given matrix resin, flow agent and such solvents and diluents that are used in the preparation of the transfer. Further, such decorating or graphic medium is selected in individual instances for a desired activity or lack of activity in any subsequent processing to which they may be subjected, as high temperature vitrification, for example, for resistance to fading or darkening within limits required upon a given product and the like. Where acidic resins are to serve as the matrix, pigments and dyes resistant to acids are selected; where such resins are markedly basic, coloring materials displaying resistance to alkalies are selected. Where aldehyde condensation reactions within the matrix are to be undergone simultaneously with transfer or subsequent to it, recognition of the acceleration of such reactions by acidic colorants and of the inhibiting influences of such reactions by basic colorants must be made. Where cellulosic resins serve as the matrix, particularly those containing nitro groups, recognition of the unstabilizing effects of basic dyes must be made; similarly, cellulosics containing acetobutyrate groups are affected by strongly acidic materials. If a multiplicity of colors are used, each color should be selected to avoid any one or more bleeding into the others, or even in the event of a single color, bleeding beyond the confines such color is desired to occupy; if vitrification under high temperature is subsequently to be performed, the coloring agent used must be selected on the basis of desired result at conclusion of such operation; if the end product the color is used upon must be subject to sunlight exposure, such color must be resistant to marked change by such over a predetermined period of time. In summary, then, the selection of a given decorating or graphic medium in accordance with this invention is subject to the same discrimination that is used otherwise in the selection of colorants, resins and auxiliary materials to be used together otherwise and well known to those versed in the art. By way of example, such pigments, lakes, dyes and other graphic media as follows are useful for most purposes in accordance with this invention:

Whites of rutile type and anatase type of titanium dioxide. Blacks of any of the carbon blacks as channel black, furnace black, lamp black, bone black, and the like; black from precipitated oxides of iron; black dyes as the hydrocarbon soluble phenoform blacks and Sudan blacks and to some extent the spirit soluble phenoform blacks. Browns of precipitated oxides of iron, natural earth browns, cadmium lithopones and the like; brown dyes as the hydrocarbon soluble phenoform browns and Sudan browns. Maroons, purples and violets of cadmium maroon lithopones, precipitated ferric oxide maroon, panamaroon, helio fast violet; violet dyes of hydrocarbon soluble alizarin irisol violet and Sudan violet. Reds of precipitated ferric oxide, natural red earths, cadmium lithopones, tungstated rhodamine toner, lithol rubine toner, alizarin, barium, Bordeaux and madder lakes; red dyes as the hydrocarbon soluble phenoform red, autol reds, helio oil reds and Sudan reds. Oranges of precipitated ferric oxide hydrate, natural red-yellow earths, cadmium orange lithopones, chrome oranges, molybdate chrome oranges; orange dyes as the hydrocarbon soluble phenoform orange and Sudan orange. Yellows of precipitated ferric oxide hydrate, natural yellow-earth, cadmium yellow lithopones, chrome yellow, benzidene yellow toners, yellow lakes; yellow dyes of hydrocarbon soluble phenoform yellow and Sudan yellow. Greens of hydrated chromium oxide, phthalocyanine green toner, chrome greens; green dye as hydrocarbon soluble alizarin cyanine green. Blues of phthalocyanine blue toners, iron blues, tungstated peacock blue, helio fast blue; blue dyes of hydrocarbon soluble alizarin sky blue and Sudan blue and spirit soluble azosol fast blues. Metallics of powders of finely divided gold, copper, bronze, brass, aluminum, nickel, and the like. Inert pigment extenders as barium sulfate, precipitated calcium carbonate and the like may be freely used in the same manner as pigments.

Decorating or graphic media for transfers to which subsequent high temperature vitrification is desired to be performed after transfer will consist for the most part of calcined metallic oxides in a high temperature fusible vitreous matrix or flux of the types well known to the ceramic and vitreous enamelling arts. Examples of colorants useful here are as follows:

Whites from titanium dioxide and from titanium oxide. Blacks from the calcined product of mixtures of oxides of nickel, of tin and of cobalt with chromate of iron. Browns from the calcined product of mixtures of manganese and of the oxides of chrome and of zinc with barium sulfate. Reds from the calcined product of mixtures of red oxides of iron, including colcothar, and of lead, and said oxides with oxides of zinc and chrome. Oranges from the calcined product of mixtures of red and yellow oxides of iron with oxides of aluminum and of zinc combined with potassium dichromate. Yellows from the calcined product of mixtures of red oxide and of oxide of copper together with titanium dioxide and potassium dichromate. Greens from the calcined product of mixtures of chrome and of copper. Blues from the calcined product of mixtures of oxides of aluminum, of zinc and of cobalt. Violets from mixtures of oxides of cobalt, of manganese and of zinc. Metallics of powders of finely divided precious metals as gold, platinum and silver.

The vitreous matrix or flux incorporated with such colorants as those described in the immediately foregoing are those similarly used in the ceramic and vitreous enamelling arts and consist of, for example, such compositions as various glass preparations from simple lead borates to the more complex borosilicates and those without lead based on cryolite, boric acid and potassium and sodium bases.

The matrix resin is in all events selected so as to be substantially incompatible with the carrier sheet. It must also be selected so as to be compatible with the surface to be decorated. The compatibility of resins with other resins, as well as glass, wood, metals and various other substances, is so well known in the art as to make extensive dissertation in this regard unnecessary.

By way of specific example of the matrix resins suitable, where the material to be decorated is a polyvinyl chloride class of resin, the matrix resin may be, for example, polyvinyl chloride acetate. Again, if the material to be decorated is to be polystyrene, the matrix resin may be itself polystyrene. If it is desired to decorate a sheet of cellulose acetobutyrate, we may use as the matrix resin, cellulose acetobutyrate. Again, if it is desired to apply the transfer to wood, the matrix resin may be any cellulosic resin.

The flow agent in accordance with this invention is selected so as to be miscible with the matrix resin but lacking compatibility for the carrier sheet. It is further selected so as to have a substantially lower molecular weight than the matrix resin. In addition, the dipoles of the flow agent molecule will preferably be about as strong as the dipoles of the matrix resin molecules.

Where the surface to be decorated is non-metallic, an oil or wax type resin flow agent such as, for example, a phthalate ester such as di-2-ethylhexyl phthalate or diphenyl phthalate is suitable. Since an oil or wax type resin flow agent reduces the affinity of the matrix resin to adhesion with metals, it is necessary for adhesion to metal surfaces to employ a polymeric resin as a flow agent. Thus, for example, polyvinyl acetate having a low molecular weight exhibited by a low thermal flow point of about 200° F. may be used in such a case.

The amount of flow agent used will vary with the individual type of such agent, with the nature of the matrix resin used and with the amount of inert solids, as pigment and the like, held by the matrix resin. Thus, oil-type flow agents in conjunction with thermoplastic matrix resins will usually be present to the amount of 20% by weight of the matrix resin where inert solids present are in nominal quantities for general printing purposes. Polymeric type flow agents and to some extent solid, melting type flow agents will be present in greater amounts, though usually not exceeding 35% by weight of the matrix resin. Where inert solids are present in relatively high proportions, as, for example, equal in weight to that of the matrix resin, the flow agent will be present to the amount of 40% by weight of the matrix resin if such is an oil type and in some instances up to 50% if the polymeric or solid, melting type flow agent is used. The greater amount of flow agent required when higher proportions of inert solids are present is occasioned by the adsorption of a portion of the flow agent on the surface of the particles of said inert solids, withholding such portion so adsorbed from performing as a flow agent for the matrix resin. Flow agents used in conjunction with thermosetting resins will be present usually to the amount of 10% by weight of such thermosetting matrix resin though up to 20% may be desirable by reason of a large proportion of inert solids present or because of a high degree of polymerization advancement in such resin matrix or similar resin transfer is performed upon.

In order to achieve the product of this invention, the coloring medium such as, for example, a pigment is dispersed in the matrix resin. A suitable solvent for the matrix resin to permit such dispersion will be added. In addition, a rapidly evaporating solvent for the matrix resin which will momentarily attack or etch the surface of the carrier sheet is further added, or a diluent is added for such purpose. The desired color strength is usually maintained by the proportion of solvent or solvent and diluent present in such mixture.

The printing mixture is completed by the addition of the flow agent. The above described mixture is then printed onto the base sheet by any one of conventional printing means suited to the particular printing mixture.

With particular reference to the solvents used, it is requisite that a solvent, which is a solvent for both the matrix resin and the flow agent and which has a slight solvent action for the transfer sheet, be used. The slight solvent effect on the transfer sheet renders it just sufficiently tacky to hold the component which is printed on the transfer sheet and which is to be transferred onto the surface to be decorated.

By way of more specific example, where the transfer sheet is cellulose acetate, methyl ethyl ketone and cyclohexanone have been found to be satisfactory. Again, for example, where the transfer sheet is silicone synthetic rubber, toluene can be used.

In addition to the above mentioned solvent, it is generally desirable to utilize one or more solvents which are good solvents for both the matrix resin and the flow agent and which have no substantial solvent action on the transfer sheet. Thus, for example, where a polyvinyl chloride type matrix resin is being used, isopropyl alcohol and methyl isobutyl ketone can be used.

It is, of course, apparent that the selection of the solvents will vary widely depending upon the choice of the materials used in the transfer sheet and for the matrix resin and flow agent. The above discussion together with the examples throughout the specification provide a sufficient teaching for those skilled in the art so that the appropriate solvents can be readily selected.

The method and products in accordance with this invention will be further clarified by a reference to the drawings. Adverting to Figure 1 there is shown a continuous printing apparatus at 2. The printing apparatus 2 has a continuous transfer sheet 4 which passes over rollers 6 and 8 and under roller 10. After passing roller 8, sheet 4 passes between roller 11 and rotogravure printing cylinder 12.

Printing cylinder 12 picks up an ink in accordance with this invention in tank 14. A wiper 16 coacts with cylinder 12 so as to wipe off excess ink. Further rotation of cylinder 12 results in printing of the cylinder design of sheet 4.

Sheet 4 then passes from roller 11 upwardly to a guide roller 18. Prior to reaching guide roller 18, the ink printed on sheet 4 dries sufficiently so that it will not be wiped off by the roller 18. After leaving guide roller 18, sheet 4 passes downwardly between roller 20 and rotogravure printing cylinder 22. Rotogravure cylinder 22 is adapted to pick up ink from tank 24, the excess ink being wiped off by the wiper 26. After the rotogravure cylinder 22 rotates beyond the wiper 26, it prints a design on an unprinted portion of sheet 4.

The previous steps are again repeated by passing sheet 4 upwardly over guide roller 28 and thence downwardly between roller 30 and rotogravure printing cylinder 32, which is adapted to pick up ink from tank 34, the excess ink being wiped off by wiper 36.

Sheet 4 is then passed over rollers 38 and 40 and thence downwardly between rollers 42 and 44. Roller 44 carries a sheet 46 of material to be decorated, which is supplied from a roll at 48, and passes over guide rollers 50 and 52 before reaching roller 44.

As shown, roller 54 is utilized to apply the solvent to the surface of the sheet 46 from a solvent-containing tank 56. Sheet 46, after it has been pressed into contact with sheet 4, and has received the printed design contained on sheet 4, is carried over guide roller 58 and rolled into a roll at 60.

Referring now to Figures 2 and 3, there is shown a transfer device 62 in accordance with this invention. The transfer device 62 has a transfer sheet 64 carrying a design comprising a leaf 66, and leaf 68 and a leaf 70. The leaves 66, 68 and 70 were printed on sheet 64 with an ink in accordance with this invention.

Referring now to Figure 4, there is shown a transfer sheet 72 carrying thereon a metal substrate 74 of gold and three leaves 76, 78 and 80 printed on the metal substrate, the leaves comprising a matrix resin and a flow agent admixed. Adverting now to Figure 6, there is shown intaglio printing apparatus 82. The apparatus 82 is particularly adapted to print a tricolored design on bottles.

As shown, the apparatus 82 has three tanks 84, 86 and 88, which are adapted to contain printing inks, and has printing rollers 90, 92 and 94 adapted to pick up ink from the tanks respectively. Each of said tanks can contain an ink of a different color and each of the printing rollers, as shown, is engraved with a component of the final design. Impression rollers 96, 98 and 99 are adapted to cooperate with printing rollers 90, 92 and 94, respectively.

A wheel shown at 100 is adapted to hold bottles 102 so that they may freely rotate about an axis passing through the center of the bottle. Bottles 102 are passed through a solvent-containing tank 104 in order that all of the surfaces of the bottles to be decorated are wetted by the solvent.

A transfer sheet 108 passes over roller 110, under roller 112 and around rollers 114 and 116. The sheet 108 then passes between rollers 94 and 99, over guide roller 118, between rollers 92 and 98, over guide roller 120 and thence between rollers 90 and 96. As the sheet is pressed against rollers 90, 92 and 94, it receives an impression of ink to form the completed design. Before reaching either guide rollers 118 or 120, the ink impression on sheet 108 dries sufficiently so that it will not be disturbed by passing over these guide rollers. After leaving roller 90, sheet 108 passes to rollers 122 and 124. As sheet 108 passes between rollers 122 and 124, it conforms to the arc which is determined by the exterior surfaces of the bottles on the wheel 100. When sheet 108 comes into contact with the bottle 102, it commences to print the carried design onto the bottle. The linear speed of the sheet 108 is faster than that of the bottle, which results in the sheet rotating the bottle and thus rolling the design contained on the sheet onto the entire outer periphery of the bottle. The transfer is assisted by the action of the solvent on the surface of the bottle.

By way of still more specific exemplification, the preparation and use of transfers in accordance with this invention in connection with specific types of materials which are to be decorated are described below:

*Transfer adapted to be used in connection with polyvinyl type resins and other materials having a similar compatibility and in connection with additional typical thermoplastic type transfer*

The transfer, in accordance with this invention, is of great utility in connection with polyvinyl chloride type resins where the material to be decorated is wholly formed out of one or more polyvinyl chloride type resins and where the material is merely coated, sized or impregnated with one or more polyvinyl chloride type resins. The softness of polyvinyl type resins in the form usually prepared for end use and their considerable flexibility makes it extremely difficult to print directly on such surfaces. In addition, where color compositions that will print upon such materials are used, the amount applied with the necessary accompanying solvent to produce even color is normally so great as to cause the printed surface to swell. This results in distortion before additional colors can be printed and in many instances precludes the use of fine detail tones and lines.

As heretofore indicated, a suitable transfer in accordance with this invention comprises a selected decorating medium, a matrix resin to carry the decorating medium and a flow agent to promote the transfer of the matrix resin to the surface to be decorated, the whole being etched on the surface of a transfer sheet by means of a suitable solvent and/or diluent.

With respect to suitable coloring mediums, the foregoing listed examples of general coloring mediums are exemplary here.

By way of more specific example of matrix resins, which may be used here, polyvinyl chloride type resins and combinations of such copolymer resins are satisfactory, thus, for example, polyvinyl chloride-acetate, polyvinyl alcohol-chloride-acetate, polyvinyl chloride-acetate-maleate, polyvinyl-vinylidene chloride, and the like may each be used alone or in various combinations.

Certain of these resins may also be admixed with other resins for specific purposes, as, for example, butylated urea-formaldehyde may be combined with polyvinyl alcohol-chloride-acetate, the former being particularly useful in that it readily disperses color and that it can readily be combined in a satisfactory manner with the latter to produce a compound with improved physical properties. Oil modified alkyd resins may also be so used. A further example of such admixture is that of polyvinyl chloride-acetate-maleate and most basic resins where a reaction product between the two is desirable. Generally speaking, a reactive group, as in the two instances given, hydroxy and maleic acid groups respectively, must be present for further copolymerization with a further resin group. Purely mechanical mixtures of any of the above polyvinyl chloride type resins and such others as polyvinyl acetate and nitrocellulose have some merit for specific applications.

By way of more specific example of flow agents, it is preferred to use di-2-ethylhexyl phthalate. However, tricresyl phosphate, cresyl diphenyl phosphate, methyl phthalyl ethyl glycolate, butyl phthalyl butyl glycollate, dibutyl phthalate, butyl benzyl phthalate, di-isooctyl phthlate are satisfactory as are a number of other compounds of oil or wax like nature compatible with polyvinyl chloride type materials.

The following examples will further clarify the embodiments of this invention which are useful here. It will be noted that in the following examples throughout the specification, all parts are by weight of the indicated quantities unless otherwise indicated. It will be further noted that the symbol q. s. where used signifies quantity sufficient or quantities as may be appropriate.

EXAMPLE 1 (All parts by weight)

A transfer having the following composition:

Transfer sheet _____ Cellulose acetate, .001 inch thick.
Pigment _____ As desired.
Matrix resin _____ Polyvinyl chloride acetate.
Flow agent _____ Di-2-ethyl hexyl phthalate.

The component to be transferred was made in accordance with the following formulation and placed on the transfer sheet by printing means well known in the art:

Pigment _____ Q. s. for desired color concentration.
Dispersed in:
  Polyvinyl chloride (90 groups), acetate (10 groups), 1 part _____
  Cyclohexanone, 3 parts _____ } Q. s. for dispersing pigment.
Resulting color paste dissolved in:
  Polyvinyl chloride (90 groups), acetate (10 groups), 3 parts _____
  Methyl ethyl ketone, 22 parts _____ } Q. s. to provide printed color value.
To which has been added di-2-ethylhexyl phthalate. Q. s. to total a ratio of 1 part to 4 parts of the polyvinyl chloride acetate resin present in the combination.

By way of still more specific exemplification, the component to be transferred was formulated as follows, the parts being by weight of the total weight of the component to be transferred:

| | Parts |
|---|---|
| Medium chrome yellow | 20 |
| Dispersed in: | |
|   Polyvinyl chloride (90 groups), acetate (10 groups) | 3 |
|   Cyclohexanone | 9 |
| Resulting color paste dissolved in: | |
|   Polyvinyl chloride (90 groups), acetate (10 groups) | 47 |
|   Methyl ethyl ketone | 344 |
| To which has been added di-2-ethylhexyl phthalate | 10 |

EXAMPLE 2 (All parts by weight)

A transfer having the following composition:

Transfer sheet _____ Cellulose acetate.
Pigment _____ As desired.
Matrix resin _____ An admixture of butylated ureaformaldehyde, polyvinyl alcohol-chloride-acetate and polyvinyl chloride-acetate-maleate.
Flow agent _____ Di-2-ethylhexyl phthalate.

The component to be transferred was made in accordance with the following formation and placed on the transfer sheet by printing means well known in the art:

Pigment _____ Q. s. for desired color.
Dispersed in:
  Butylated urea-formaldehyde, 3 parts __
  Normal butyl alcohol, 1 part _____ } Q. s. for dispersing pigment.
  Xylene, 1 part _____
Resulting color paste dissolved in:
  Polyvinyl alcohol (6 groups), chloride (91 groups), acetate (3 groups) (room temperature soluble type), 3 parts.
  Isopropyl alcohol, 4 parts _____ } Q. s. to total a ratio of 17 parts of the polyvinyl alcohol-chloride-acetate to 12 parts of the butylated urea-formaldehyde.
To which is added:
  Polyvinyl-chloride (86 groups), acetate (13 groups), maleate (1 group) (room temperature soluble type), 2 parts.
  Isopropyl alcohol, 3 parts _____ } Q. s. to total a ratio of approx. 6 parts of polyvinyl-chloride-acetate-maleate to 4 parts of polyvinyl alcohol-chloride-acetate.
Di-2-ethylhexyl phthalate _____ Q. s. to total a ratio of 1 part to 4 parts of the combined quantities of the two polyvinyl copolymers.
Methyl ethyl ketone _____ Q. s. to provide a ratio of 11 parts to 9 parts of all other components combined exclusive of the pigment.

By way of still more specific exemplification, the component to be transferred was formulated as follows, the parts being by weight of the total weight of the component to be transferred:

| | Parts |
|---|---|
| Cadmium red lithopone | 80 |
| Dispersed in: | |
|   Butylated urea-formaldehyde | 12 |
|   Normal butyl alcohol | 4 |
|   Xylene | 4 |
| Resulting color paste dissolved in: | |
|   Polyvinyl alcohol (6 groups), chloride (91 groups), acetate (3 groups) (room temperature soluble type) | 17 |
|   Isopropyl alcohol | 24 |
| To which is added: | |
|   Polyvinyl-chloride (86 groups), acetate (13 groups), maleate (1 group) (room temperature soluble type) | 26 |
|   Isopropyl alcohol | 39 |
|   Di-2-ethylhexyl phthalate | 9 |
|   Methyl ethyl ketone | 162 |

The above formulations may be reduced in color strength when desired by the addition of a lacquer comprising 15 per cent. polyvinyl-chloride-acetate-maleate, 3.75 per cent. di-2-ethylhexyl phthalate, 20 per cent. isopropyl alcohol and the balance to total 100 per cent. in methyl ethyl ketone; or it may be increased in color strength by reduction in any desired amount, of these components already present in said formulation, in the same proportion, but in either instance, the ratio, as shown, of di-2-ethylhexyl phthalate must be held.

EXAMPLE 3 (All parts by weight)

A transfer having the following composition:

Transfer sheet ___ Silicone synthetic rubber.
Pigment _____ As desired.
Matrix Resin ____ An admixture of butylated urea-formaldehyde, polyvinyl alcohol chloride acetate and polyvinyl chloride acetate maleate.
Flow agent _____ Di-2-ethylhexyl phthalate.

The component to be transferred was made in accordance with the following formulation and placed on the transfer sheet by printing means well known in the art:

Pigment _____ Q. S. for desired color concentration.
Dispersed in:
  Butylated urea-formaldehyde, 3 parts __
  Normal butyl alcohol, 1 part _____ } Q. s. to disperse pigment.
  Zylene, 1 part _____
Resulting color paste dissolved in:
  Polyvinyl alcohol (6 groups), chloride (91 groups), acetate (3 groups) (soluble polymer at room temperature), 2 parts.
  Toluene, 4 parts _____ } Q. s. to total a ratio of 17 parts of polyvinyl-alcohol-chloride-acetate to 12 parts of the butylated urea-formaldehyde.
To which is added:
  Polyvinyl chloride (86 groups), acetate (13 groups), maleate (1 group) (soluble polymer), 1 part.
  Toluene, 3 parts _____ } Q. s. to total a ratio of approx. 6 parts of polyvinyl-chloride-acetate maleate to 4 parts of polyvinyl alcohol-chloride acetate.
Di-2-ethylhexyl phthalate _____ Q. s. to total a ratio of 1 part to 4 parts of the combined quantities of the two polyvinyl copolymers.
Methyl ethyl ketone _____ Q. s. to provide a ratio of approx. 18 parts to a combined 27 parts of the other components in the proportions given exclusive of the pigment.

By way of still more specific exemplification, the component to be transferred was formulated as follows, the parts being by weight of the total weight of the component to be transferred:

| | Parts |
|---|---|
| Furnace black | 5 |
| Dispersed in: | |
|   Butylated urea-formaldehyde | 12 |
|   Normal butyl alcohol | 4 |
|   Xylene | 4 |
| Resulting color paste dissolved in: | |
|   Polyvinyl alcohol (6 groups), chloride (91 groups), acetate (3 groups) (soluble polymer at room temperature) | 17 |
|   Toluene | 34 |

To which is added:

| | Parts |
|---|---|
| Polyvinyl chloride (86 groups), acetate (13 groups), maleate (1 group) (soluble polymer) | 26 |
| Toluene | 78 |
| Di-2-ethylhexyl phthalate | 9 |
| Methyl ethyl ketone | 123 |

It will be noted that the formulation in Example 3 differs basically from those of Examples 1 and 2, principally in that toluene is utilized as a diluent in Example 3. This is done since toluene provides temporary softening of the surface of the silicone transfer sheet to provide printing tack. In Examples 1 and 2 this printing tack is provided by the methyl ethyl ketone.

The designation of numerical ester or other groups in conjunction with the copolymers in the above examples and in those that follow are the proportion of these groups present in ratio to each other in the copolymer structure and are not intended to indicate the bare number of such groups present.

All of the above exemplified transfers are tack free at room temperature, thus, they may be rolled up or stacked as is appropriate and stored away for use when desired.

The transfers thus made in accordance with this invention and stored may be taken out of storage and without further treatment can be used to decorate materials consisting in whole or in part of polyvinyl chloride type resins, materials compatible with polyvinyl chloride type resins, or materials previously coated, sized or impregnated with polyvinyl chloride type resins, or with materials compatible with polyvinyl chloride type resins.

While the foregoing examples are descriptive only of transfer mediums, in accordance with this invention, for transferring onto polyvinyl chloride type materials and materials compatible with such, many other transfers for materials differing from such may be prepared also in accordance with this invention. Transfers suitable for use in decorating, for example, cellulose acetobutyrate, nitrocellulose and polystyrene are described in the following:

EXAMPLE 4 (All parts by weight)

Cellulose acetobutyrate transfer print composition:

Transfer sheet _____ Cellulose acetate.
Pigment _____ As desired.
Matrix resin _____ Cellulose acetobutyrate.
Flow agent _____ Butyl benzyl phthalate.

The component to be transferred was made in accordance with the following formulation and placed on the transfer sheet by printing means well known in the art:

Pigment _____ Q. s. for desired color concentration.
Dispersed in:
  Cellulose acetobutyrate (type: low free hydroxyl, 45% acetyl-55% butyral; medium viscosity), 1 part.
  Cyclohexanone, 3 parts _____ } Q. s. for dispersing pigment.
Resulting color paste dissolved in:
  Cellulose acetobutyrate (type: as above but low viscosity), 14 parts.
  Methyl ethyl ketone, 86 parts _____ } Q. s. for reducing above to desired color concentration.
To which is added butyl benzyl phthalate __ Q. s. to total a ratio of 1 part to 3 parts of the total quantity of cellulose acetobutyrate exclusive o pigment.

By way of still more specific exemplification, the component to be transferred was formulated as follows, the parts being by weight of the total weight of the component to be transferred:

| | Parts |
|---|---|
| Precipitated ferric oxide | 5 |
| Dispersed in: | |
|   Cellulose acetobutyrate (type: low free hydroxyl, 45% acetyl–55% butyral; medium viscosity) | 1 |
|   Cyclohexanone | 3 |
| Resulting color paste dissolved in: | |
|   Cellulose acetobutyrate (type: as above but low viscosity) | 14 |
|   Methyl ethyl ketone | 86 |
| To which is added butyl benzyl phthalate | 4 |

An example of carrier material above that would be suitable for printing upon for transfer purposes is cellulose acetate film plasticized with dimethyl phthalate and/or diethyl phthalate. Wood surfaces and other surfaces composed in part or in whole of cellulose fibers are examples of materials upon which such a transfer material can be used.

EXAMPLE 5 (All parts by weight)

Nitrocellulose transfer print composition:

Transfer sheet _____ Cellulose acetate.
Pigment _____ As desired for color.
Matrix resin _____ Admixture of polyvinyl chloride acetate and nitrocellulose.
Flow agent _____ Diphenyl phthalate.

The component to be transferred was made in accordance with the following formulation and placed on the transfer sheet by printing means well known in the art:

Pigment _____ Q. s. for desired color concentration.
Dispersed in:
  Polyvinyl chloride (62 groups), acetate (38 groups) (soluble polymer at normal room temperature), 1 part.
  Cyclohexanone, 2 parts _____
  Normal butyl alcohol, 1 part _____ } Q. s. for dispersing pigment.
Resulting color paste dissolved in:
  Polyvinyl-chloride (62 groups), acetate (38 groups) (soluble polymer at normal room temperature), 1 part.
  Nitrocellulose (pyroxylin), low-viscosity type, 2 parts.
  Isopropyl alcohol, 4 parts _____
  Methyl ethyl ketone, 13 parts _____ } Q. s. for reducing above to desired color concentration.
To which is added, diphenyl phthalate _____ Q. s. to total a ratio of 1 part to 3 parts the total combined quantity of the polyvinyl copolymer and nitrocellulose exclusive of pigment.

By way of still more specific exemplification, the component to be transferred was formulated as follows, the parts being by weight of the total weight of the component to be transferred:

| | Parts |
|---|---|
| Titanium dioxide (rutile) | 15 |
| Dispersed in: | |
|   Polyvinyl chloride (62 groups), acetate (38 groups) (soluble polymer at normal room temperature) | 4 |
|   Cyclohexanone | 8 |
|   Normal butyl alcohol | 4 |
| Resulting color paste dissolved in: | |
|   Polyvinyl-chloride (62 groups), acetate (38 groups) (soluble polymer at normal room temperature) | 5 |
|   Nitrocellulose (pyroxylin), low viscosity type | 10 |
|   Isopropyl alcohol | 20 |
|   Methyl ethyl ketone | 65 |
| To which is added diphenyl phthalate | 6 |

Any of the carrier materials described in conjunction with examples of polyvinyl chloride type transfers will serve as examples upon which to print the above formulation for transfer purposes. Wood surfaces and like materials, pyroxylin coated surfaces and polyvinyl chloride type materials are examples upon which such a transfer is operable.

EXAMPLE 6 (All parts by weight)

Polystyrene transfer print composition:

Transfer sheet _____ Silicone synthetic rubber.
Pigment _____ As desired for color.
Matrix resin _____ Polystyrene.
Flow agent _____ Admixture of butyl benzyl phthalate and diphenyl phthalate.

The component to be transferred was made in accordance with the following formulation and placed on the transfer sheet by printing means well known in the art:

Pigment _____ Q. s. for desired color concentration.
Dispersed in:
  Polystyrene (low thermal softening type), 1 part _____
  Xylene, 2 parts _____
  Cyclohexanone, 1 part _____ } Q. s. for dispersing pigment.
Resulting color paste dissolved in:
  Polystyrene (low thermal softening type), 3 parts _____
  Toluene, 11 parts _____
  Methyl ethyl ketone, 11 parts _____ } Q. s. for reducing above to desired color concentration.
To which is added butyl benzyl phthalate___ Q. s. to total a ratio of 1 part to 5 parts of total quantity of polystyrene.
Diphenyl phthalate_____ Q. s. to total a ratio of 2 parts to 15 parts of total quantity of polystyrene.

By way of still more specific exemplification, the component to be transferred was formulated as follows, the parts by weight of the component to be transferred:

| | Parts |
|---|---|
| Reduced phthalacyanine blue | 10 |
| Dispersed in: | |
| Polystyrene (low thermal softening type) | 3 |
| Xylene | 6 |
| Cyclohexanone | 3 |
| Resulting color paste dissolved in: | |
| Polystyrene (low thermal softening type) | 48 |
| Toluene | 176 |
| Methyl ethyl ketone | 176 |
| To which is added butyl benzyl phthalate | 8 |
| Diphenyl phthalate | 7 |

Such carrier materials as cellulose acetate film plasticized during its manufacture with dimethyl phthalate and/or diethyl phthalate or such a material as silicone synthetic rubber are useful examples of carriers upon which to print the above to produce transfer. Molded polystyrene will accept such transfer; the nature of either of the transfer carriers noted here are capable of being drawn to moderate shapes during the transfer operation to permit such premolded polystyrene shapes to be transferred thereon.

One of the many advantages of this invention is that such a decorative transfer may be accomplished through the use of a minute quantity of solvent which will not materially attack the matrix resin, the carrier sheet or the surface to be decorated.

These transfers may be used at normal room temperature or, where desirable, at only slightly elevated temperatures, when transfer is carried out in the presence of a selected solvent, mixture of solvents, or combination of solvent or solvents and diluent or diluents, when such are provided in convenient form for such a purpose and are kept to proportions of less than that required to form an appreciably complete solution of the matrix resin contained in the composition of a given transfer.

Types of solvents or solvent diluent mixtures for use as described are those having good solvent characteristics for the matrix resin and flow agent components of the transfer. Such solvent, solvents or solvent-diluent combinations are those preferred that exhibit somewhat less solvent powers to the carrier sheet upon which the transfer substance is originally printed. Further, such solvent, solvents or solvent-diluent combinations should be prepared for not too rapid a solvent release in order to prevent premature loss by evaporation before the presence of such solvent-agent can be put to use.

Briefly, the method of operation for transfer of the intermediate prepared for such purpose in accordance with this invention by solvent-agent means is to bring said transfer intermediate, printed side adjacent, into intimate contact with a solvent-agent wetted surface of a suitable material to receive such transfer, as between rollers, for example, said material to receive the transfer having its surface so wetted just prior to contact with said transfer material by means of spreading upon its surface in any manner convenient a solvent or mixture of solvents or combination of solvent or solvents and diluent or diluents. After the transfer medium and the solvent-agent wetted material receiving the transfer have been brought together, the transfer sheet may be removed, either immediately or shortly thereafter, depending on individual circumstances, parting cleanly and leaving the transferred pattern or coating attached to the material provided for that purpose. After drying has been accomplished by any suitable means, the transferred pattern or coating will remain, for all general purposes, as a permanent part or, with some materials, as an integral part of the material upon which it has been transferred.

The resin and flow agent combination carrying the coloring material superficially, but only lightly, attached to the carrier sheet, which is largely incompatible with said combinations, when brought to an increased softened state occasioned by solvent action, loses all attachment to the carrier upon which it has been printed or coated and enters into close association with a compatible material brought into intimate contact with it, said compatible material being highly receptive to such by virtue of a similar highly softened state having been brought about within it or upon its surface by simultaneous action of the same solvent agent.

Completion of a high degree of attachment to the material receiving the transfer occurs only after evaporation of the solvent or mixture of solvents or combination of solvent or solvents and diluent or diluents used, as has been described. To avoid pattern distortion, only the proper amount of solvent agent to effect transfer under conditions described must be brought into intimate contact with the transfer film upon the surface of the material to receive the transfer. Any avoidable excess of solvent agent may deter non-distortion of pattern, though some reasonable latitude in this will generally prevail.

By way of more specific example, the following solvents and solvent diluent mixtures have been found to be satisfactory:

Methyl ethyl ketone, methyl ethyl ketone and toluene, methyl isobutyl ketone, methyl isobutyl ketone and toluene or toluene and xylene, acetone and cyclohexanone, and the like. Actually, any good solvent for the matrix resin-flow agent combination may be used which has a high rate of evaporation. Usually it is well to add either a suitable diluent to this, as the toluene indicated, or a similar solvent with a low rate of evaporation, as the cyclohexanone, to control solvent release to that of a desired rate for a given set of operating circumstances.

Where, due to reasons of economy or due to small production requirements, it is desired to prepare a transfer medium in accordance with this invention by planographic means, as for example, by offset lithography, or by typographic methods, a somewhat different preparation from those above discussed may be used. The following are exemplary of such formulations:

EXAMPLE 7 (All parts by weight)

On any one of the previously exemplified carrier sheets, the following formulation was printed by lithographic or typographic means:

| | |
|---|---|
| Lithographic drying oil type varnish | Q. s. for purpose. |
| Suitable drier for above | Q. s. for purpose. |
| In which is dispersed preferably by grinding: | |
| Pigment | Q. s. for color value. |
| Diphenyl phthalate | Q. s. to total an approximate ratio of one part to four parts of the described varnish. |

By way of still more specific exemplification, the component to be transferred was formulated as follows, the parts by weight of the component to be transferred:

| | Parts |
|---|---|
| No. 1 lithographic drying oil (linseed) type varnish | 50 |
| Cobalt linoleate (6%) drier for above | 1 |
| In which is dispersed preferably by grinding: | |
| Molybdate chrome orange | 150 |
| Diphenyl phthalate | 13 |

The lithographic drying oil type varnish may be, for example, boiled linseed oil varnish, China-wood oil varnish, safflower oil varnish, oil modified alkyd varnishes and the like, any of which are prepared for normal use in standard lithographic ink formulations well known to the art. Driers used are the standard lead, manganese or cobalt naphthanates, linoleates, resinates, and the like universally used for such purpose.

Actually, what is indicated in the above formulation is a simple lithographic ink as that in standard use in the art to which has been added a proportion of diphenyl phthalate, as indicated, preferably by milling. The pigment may be any of a type heretofore indicated for use with vinyl chloride type resins and well known to the art.

Following such printing, either immediately thereafter or later, the area of the so printed pattern is coated with a lacquer prepared as follows, the parts being weight of the total weight of the lacquer:

| | Parts |
|---|---|
| Polyvinyl alcohol-chloride-acetate (soluble polymer of 91 chloride, 3 acetate, 6 alcohol group type) | 4 |
| Di-2-ethylhexyl phthalate | 1 |
| Isopropyl alcohol | 6 |
| Methyl ethyl ketone | 9 |

Such a lacquer may be colorless or further colored for background purposes by the addition of any suitable coloring material.

Such printed patterns when transferred will usually exhibit a practical degree of permanence upon polyvinyl chloride type materials. Variations of the lacquer formulas may be made to provide similarly prepared transfer mediums in accordance with this invention for such materials as pyroxylin, polystyrene and the like by use of undercoating formulations for such a purpose of a nature similar to such lacquer phases as described earlier in conjunction with solvent type ink or coating formulations for such materials.

For use in connection with lithographic or typographic printing means, a printing ink in accordance with this invention may include a matrix resin that has been fluxed with butyl phthalyl butyl glycollate. Such an ink is set forth in the following example:

EXAMPLE 8

| | |
|---|---|
| Transfer sheet | Cellulose acetate. |
| Matrix resin | Polyvinyl alcohol-chloride-acetate. |
| Pigment | As desired. |
| Flow agent | Butyl phthalyl butyl glycollate. |
| Drying oil varnish | As desired. |
| Dryer for above | As desired. |

By way of still more specific exemplification, the component to be transferred was formulated as follows:

| | |
|---|---|
| Matrix resin | Polyvinyl alcohol-chloride-acetate. |
| Pigment | Molybdate chrome orange. |
| Flow agent | Butyl phthalyl butyl glycollate. |
| Drying oil varnish | No. 1 lithographic oil (linseed) varnish. |
| Dryer for above | Cobalt linolate (6%). |

Such a transfer is reduced by fluxing polyvinyl alcohol chloride acetate with butyl phthalyl butyl glycollate in approximately equal proportions. They are then ground together with the pigment and sufficient drying oil varnish containing dryer is added to provide the necessary consistency for a useful ink. The thus produced ink is then printed on the transfer sheet.

In the above example it is desirable to add a stabilizer totaling about 5% of the weight of the matrix resin and the butyl phthalyl butyl glycollate and comprising dibasic lead phosphite with a small percentage of dibasic lead stearate. Such stabilizer should be added before the fluxing occurs.

It will be appreciated that where, as in Example 7, a special lithographic type ink is first printed on the transfer sheet and then overcoated, it will be equally satisfactory to place the said coating directly on the surface which is to be decorated immediately before the transfer is brought into contact with said surface to be decorated. The transfer operation may then be carried out in the same manner as previously described for other solvent transfer operations.

Such solvent type transfer method has particular convenience where the transfer sheet is a permanent continuous web or belt in that such transfer sheet may be continuously lithographed or otherwise printed and carried continuously to a point of transfer where it meets the freshly lacquered surface.

*Transfers in accordance with this invention which are particularly suitable for use in connection with glass and metal surfaces*

Transfers in accordance with this invention are extremely useful in connection with glass, related silicious materials and metals. Here, as previously set forth, the transfers in accordance with this invention comprise a transfer sheet, a coloring medium, a matrix resin to carry the coloring medium and a flow agent to promote the transfer of the matrix resin from the carrier sheet to the surface to be decorated. Such transfers may be so composed to permit a high degree of integration to the surface to which they are applied by vitrification under high temperatures after the transfer procedure has been completed.

With particular refrence now to transfers which are desired as becoming integral with the surface of glass to which they are applied or otherwise are desired as a final vitreous coating or pattern on the surface of other silicious materials or on the surface of metals, it is necessary to select the coloring medium from among those specifically prepared with vitrifiable properties of the order used by the vitreous enamelling arts for glass, ceramics and metals. Such colors are usually metallic oxides and the like, as earlier exemplified, fused together with various silicious materials, and the like, also as earlier exemplified, and mechanically reduced to five powders having initial handling properties similar to those of unmodified pigments but having a lesser degree of coloring ability than such as is to be expected from substances comprising only in part of actual pigment. Their preparation is of a standard nature and of importance here only where a large proportion of highly basic ingredients are used, particularly to secure relatively low temperature fusion or vitrification on certain classes of materials, where under such circumstances undesired chemical activity between the components of the transfer and that of the vitreous color preparation must be guarded against. The term vitrifiable color as used here will mean a mixture of colorant and silicious material, or the like, forming a vitrifiable matrix or flux for such colorant, the two either prefused and mechanically reduced as a common powder or mechanically reduced as powders separately and intimately mixed, both methods of handling being common in the arts of ceramics and vitreous enamelling.

The matrix resin which carries the vitrifiable color will be selected so as to be compatible with the glass surface which is to be decorated. The following resins have been found to be satisfactory:

Polyvinyl alcohol-butyraldehyde, polyvinyl acetate and combinations of polyvinyl alcohol-chloride acetate and polyvinyl acetate; in the latter instance, a low molecular weight polyvinyl acetate having a fusion temperature of about 200° F. is used.

The flow agent used will depend in part upon the nature of the matrix resin used and in part as to whether the vitrifiable color preparation used is highly basic. When polyvinyl alcohol-butyraldehyde is used as the matrix resin and no strong basic influence is present, butyl benzyl phthalate is useful as the flow agent; where such basic influence does prevail, an oil-type wholly aromatic hydrocarbon condensate of petroleum may be used as the flow agent. Dibutyl phthalate performs well as the flow agent for such matrix resin as polyvinyl acetate when highly basic conditions are not prevalent; when such conditions are prevalent, the same petroleum aromatic hydrocarbon condensate may be used as the flow agent. Where a combination of polyvinyl alcohol-chloride-acetate and low molecular weight polyvinyl acetate are used as the matrix resin, the said polyvinyl acetate will act in both capacities as flow agent and matrix resin. However, as such low molecular weight polyvinyl acetate exhibits poor parting qualities from such transfer sheets as are convenient to use, its properties as a flow agent will best be supplemented by the addition of such a substance as diphenyl phthalate. The usefulness of the described petroleum aromatic hydrocarbon condensate as a flow agent when strongly basic vitrifiable colors are present lies in the fact that such a petroleum derivative is far less susceptible to chemical affinity with bases than are other oil type materials useful as flow agents and thus its original identity and function in the transfer composition is maintained without undesirable alteration. Both butyl benzyl phthalate and dibutyl phthalate are useful as the flow agent for both such matrix resins are polyvinyl alcohol-butyraldehyde and polyvinyl acetate. The petroleum aromatic hydrocarbon condensate is also useful as a supplementary flow agent for the joint matrix resin-flow agent combination of polyvinyl alcohol-cholride-acetate and low molecular weight polyvinyl acetate, as is dibutyl phthalate. Examples of other substances useful as flow agents to all three marixix resin systems are butyl phthalyl butyl glycollate and methyl phthalyl ethyl glycollate. Ethyl phthalyl ethyl glycollate and commercial mixtures of N-ortho and para toluene sulfonamides are further examples of flow agents useful to either polyvinyl alcohol-butyraldehyde or polyvinyl acetate marix resins. In addition, such substances as tricresyl phosphate, cresyl diphenyl phosphate, and the like are useful flow agents for polyvinyl alcohol butyraldehyde matrix resins, and diphenyl phthalate, triphenyl phosphate, ortho-nitro-biphenyl, and the like are useful flow agents for polyvinyl acetate resins; di-2-ethylhexyl phthalate is also useful as a flow agent for polyvinyl acetate matrix resins and in addition as a supplementary flow agent for polyvinyl alcohol-chloride-acetate and low molecular weight polyvinyl acetate matrix-flow agent resin combinations.

The following example is typical of such a transfer:

EXAMPLE 9

A transfer having the following composition:

Transfer sheet _____ Silicone synthetic rubber.
Pigment _____ Vitrifiable color.
Matrix resin _____ Polyvinyl alcohol-butyraldehyde.
Flow agent _____ Butyl benzyl phthalate.

The component to be transferred was made in accordance with the following formulation and placed on the transfer sheet by printing means well known in the art, the parts being by weight of the total weight of the component to be transferred:

| | Parts |
|---|---|
| Vitrifiable color | 3 |
| Dispersed in butyl benzyl phthalate | 2 |
| Admixed with: | |
| Polyvinyl alcohol butyraldehyde (soluble copolymer of approx. group proportions of 82 polyvinyl butyraldehyde to 18 polyvinyl alcohol) | 3 |
| Toluene | 10 |
| Methyl ethyl ketone | 30 |
| Methyl denatured ethyl alcohol | 10 |

By way of still more specific exemplification, the component to be transferred was formulated as follows, the parts by weight of the component to be transferred:

| | Parts |
|---|---|
| White vitrifiable color of titanium dioxide (rutile), 30%, in a vitreous flux-matrix of lead borate, 70% | 3 |
| Dispersed in butyl benzyl phthalate | 2 |
| Admixed with: | |
| Polyvinyl alcohol butyraldehyde (soluble copolymer of approx. group proportions of 82 polyvinyl butyraldehyde to 18 polyvinyl alcohol) | 3 |
| Toluene | 10 |
| Methyl ethyl ketone | 30 |
| Methyl denatured ethyl alcohol | 10 |

Coloring power may be reduced by increasing the amounts, in proportion, of the toluene, ketone and alcohol present. If a stronger color is desired, such will best be obtained by superposing two or more impressions of the same pattern over each other in close register and in the same color during the printing of the transfer component on the transfer sheet, as vitrifiable colors are notoriously weak due to their high content of non-colored agents.

At any time convenient after transfer has been accomplished, "firing" of the glass object may be undertaken to fuse the color components of the transferred print or coating integral with the glass. To accomplish this, the glass object is put through a heating cycle that first burns off all organic materials and, as the temperature is increased to that of fluxing, fuses the vitrifiable color to the glass, after which the temperature is reduced gradually to room temperature, resulting in a permanent "burned-in" print or coating to the surface of the glass object. In like manner, various ceramic materials may be similarly treated, as may be metals, having first been applied with a printed pattern or coating by such a transfer medium as that described in this example prepared in accordance with this invention.

In addition to solid glass objects and the like, materials composed of glass fibers may be similarly decorated with such a transfer print or coating from such transfers. For such a purpose, a transfer having low temperature fluxing properties is desirable, as temperatures much above 800° F. will cause a semi-fused aggregation of fibers. This results in a weakening of the fibers and reduces the value of the fibrous nature of the material.

The preparation of fine glass fiber textiles and mat materials usually requires the use of an oil or other sizing agent being applied to them to facilitate handling. Such a sizing agent is also helpful in further handling of such materials in their finished forms up to the point of their use for a given specific application. Fibrous glass materials to receive a transferred print or coating from a transfer prepared in accordance with this invention are so sized or oiled with an oil-type substance analogous to such substance used as the flow agent in the preparation of the transfer.

The presence of such an oil in contact with the transfer medium will not interfere with transfer to the glass fibers, as under the conditions of temperature used for such transfer it will tend to dissolve into the matrix resin and can aid in increasing the speed of transfer, though a smaller amount of such oil than that described in the transfer formulation may be carried as the flow agent of the transfer medium composition itself, under such circumstances, to allow for that so received from the glass fibers.

The glass fiber material to receive the transfer is usually in the form of woven textile fabrics or as a random fiber mat or an oriented fiber mat. In any of these forms it is supplied in continuous lengths as is common with other fabrics.

After transfer has been accomplished, the fibrous glass material carrying the transferred print or coating is passed through an oven heated between 700° F. and 800° F. for a sufficient length of time to burn out all organic substances and to flux the remaining print or coating color to the glass fiber. This temperature has a simultaneous action of setting the crimp of the weave, if cloth, or a felting crimp, so to speak, if mat, which while incidental to "burning in" the color print or coat, is a standard processing technique.

While not pertinent to operability of the transfer medium prepared in accordance with this invention upon fibrous glass materials other than to illustrate that such materials receiving such transfer will permit further desired treatment, said fibrous glass material is then passed through a solution or emulsion of a siloxane oil where it is further heat treated at about 350° F., said oil reacting with the glass to render it soft, flexible and "silk-like" without disturbing the now integrally fused in color pattern or coating, but acting on such much in the same manner as the glass fibers, producing an end product resembling printed or colored silken material of great durability.

In the case of transferring upon solid glass surfaces and the like, as bottles, for example, as described, a transfer carrier of unsupported elastic silicone synthetic rubber is of particular usefulness because such can be drawn around a roller surface of a profile to bring such a transfer medium into intimate contact with both the straight sides of such an object as well as the curvature of the shoulder and neck of same, though printing of the same carrier may be conveniently performed upon a flat surface before transfer. In the instance of transfer to glass fiber materials, as described, a supported silicone synthetic rubber transfer carrier is preferable, also from the standpoint of its heat resistance, but further because such a material has a yielding surface that enables it to come into quite close contact with the textured surface presented by the fibrous glass material.

Transfers in accordance with this invention that are particularly well adapted for use in connection with the decorating of glass objects as bottles and the like will carry a vitrifiable color capable of fluxing at temperatures of approximately 1100° F. to 1250° F., those for metal, as steel, for example, will usually flux in the range of roughly 1300° F. to 1500° F., for ceramics such colors may flux at substantially higher temperatures, approaching and sometimes exceeding 2000° F.

*Solvent methods for effecting transfer operations*

Where it is desired to transfer a pattern or coating from a transfer medium prepared in accordance with this invention to normally impervious surfaces which are not compatible in themselves to the transferable substance of the transfer material but are receptive by adhesion from solvent solution of materials that are so compatible, such transfer action may be carried out by first coating the surface to be decorated with a lacquer which is compatible with both the surface to be decorated and with the matrix resin of the transfer. As soon as the lacquer coating is applied, the transfer is rolled into intimate contact with the thus lacquered surface, and the transfer sheet is then stripped free, leaving the transfer pattern behind. Moderate heat may be used to complete the operation by drying of the solvent in the lacquer.

A specific example of such a transfer is given herewith in conjunction with a material prepared from a felt base substance impregnated with a commercial asphalt compound and surfaced with a fully cured drying oil-type mineral filled paint, said material being representative of that commodity used in low-cost floor coverings.

In this instance, the painted surface of the said material is lightly coated with a lacquer prepared from polyvinyl alcohol-chloride-acetate of a type earlier described, as approximately a fifteen per cent. solution in a mixture of equal parts of methyl ethyl ketone and toluene or by a lacquer prepared from a readily soluble copolymer of polyvinyl chloride-acetate of the type also earlier described, having approximately a relative proportion of 62 chloride ester groups to 38 acetate ester groups, said polyvinyl chloride acetate being combined in equal quantity with a low viscosity type pyroxylin and said combination being dissolved as a twenty per cent. solution in a mixture of equal quantities of methyl ethyl ketone and toluene.

A transfer medium prepared in accordance with this invention, for example, as any one of those described for use as a transfer to polyvinyl chloride type materials or to pyroxylin type materials is rolled into intimate contact against the so coated surface of the cured paint strata of the said asphalt impregnated felt base immediately following the application of the lacquer and is permitted to remain in contact for a very brief time up to a few seconds without further pressure, after which the transfer sheet is stripped free, leaving the transferred pattern behind. Moderate temperature, drying off of the solvent, is carried out after transfer is effected, firmly anchoring the transferred pattern to the surface of the painted felt base material.

A moderate warming of the transfer medium to about 125° F. at the point at which it is rolled into intimate contact with the described painted strata will speed up the operation as it will increase the solvent-action that loosens the transfer pattern from its carrier, as earlier described, and hasten the period of drying off the solvent agent after said carrier has been stripped, though such heating is not essential to the operability of transfer in this example.

A further example of solvent actuated transfer from a transfer medium prepared in accordance with this invention is given herewith in conjunction with such a pervious surface as that encountered on common commercial type of compressed, exploded wood fiber hardboard.

In this instance, lacquers in the form described in the immediately foregoing example are too readily absorbed by such a pervious material as that of the said hardboard and while the use of such lacquer will readily effect transfer in a similar manner as described in said earlier example, absorption of the printed matter or coating from the transfer will be so great as to often destroy its color value or values and in some instances obscure part of the transferred pattern.

To avoid this, a suitable solvent type lacquer is prepared in emulsion form and is used in the same manner as described for the paint coated felt-base material. The lacquer phase in such an emulsion thus remaining upon the surface of the hardboard during the transfer operation, permitting the solvent to effect transfer during intimate contact with the transfer medium and after the carrier sheet is stripped clean, drying without undue absorption into the hardboard surface after evaporation of both the water and solvent, becoming firmly attached to said hardboard surface and equally so to the pattern transferred from the transfer prepared in accordance with this invention, said pattern losing nothing in either color or pattern value.

An example of a lacquer emulsion prepared for use of such transfer mediums as described in the immediately foregoing example in conjunction with said hardboard materials in the present example is as follows, the parts being by weight of the total weight of the emulsion:

EXAMPLE 10

| | Parts |
|---|---|
| Water phase: | |
| Polyvinyl alcohol-acetate (medium molecular weight, 87% hydrolysis) | 1.85 |
| Denatured methyl alcohol | 2.50 |
| Water | 25.50 |
| Glycerol | 6.00 |
| Polyvinyl acetate emulsion (55% high molecular weight solids) | 12.00 |
| Lacquer phase: | |
| Polyvinyl alcohol-chloride-acetate (soluble polymer-ester groups relative as 91% chloride, 3% acetate, plus 6% alcohol groups) | 30.00 |
| Toluene | 45.00 |
| Methyl ethyl ketone | 110.00 |

The resulting emulsion prepared from the above formula is highly stable and has an almost "cold-cream" like consistency.

It may be mechanically wiped very thinly upon the surface of pervious hardboard to effect transfer as described and will effect such transfer by release of its solvent agent, as described, either under conditions of normal room temperature or those of moderately elevated temperatures. In the latter instance, if desired, the hardboard to receive the transfer may be preheated to a temperature of, for example, 125° F. or a similar temperature may be brought to bear against the transfer medium at the point of intimate contact during the transfer operation. In either instance, transfer speeds are increased and in the first instance subsequent drying after transfer is considerably accelerated.

It will be understood that the component of the transfer device, which is to be transferred to the surface to be decorated, is of the nature of an ink in the form which it takes at the stage where it is ready for printing on the transfer sheet of the transfer device, and it is, therefore, termed an ink in the specification and claims.

*Method of multicolor printing*

It will be at once apparent that the above described transfer inks, transfer devices as a whole and methods for using these transfer devices are well adapted for use in connection with any of the well known multicolor printing means such as, for example, rotogravure, typographic, lithographic or intaglio.

By way of more specific example of a multicolor printing operation, a continuous transfer sheet of one of the before mentioned types can be carried by a plurality of rollers in a conventional manner. If it is desired to have a three-color design, three rotogravure printing cylinders, each one carrying a different color printing ink supplied by baths through which the rollers pass and formulated in accordance with any one of the before mentioned formulations which might be appropriate, can be used.

The transfer sheet can pass over these rollers successively being pressed into contact with them by impression rollers. The run between rotogravure printing cylinders must be sufficiently long to permit the ink previously deposited or printed on the transfer sheet to dry at least partially.

After passing between the second and third set of rotogravure printing cylinders and impression rollers which again are spaced to permit drying of the ink between printings, the transfer sheet will be led to an impression roller which will force the transfer sheet into intimate contact with the surface to be decorated.

If the surface to be decorated is sheet material and a solvent is to be used to effect the transfer, the sheet material to be decorated can be pressed into contact with a roller which is continuously passing through a bath of the selected solvent. The sheet can then be placed so that an impression roller can force the transfer sheet into intimate contact with it. It will be apparent that such a method readily lends itself to continuous operation through the use of appropriate rollers.

It will be apparent that a transfer can be effected by the combination of a solvent and the application of heat.

The ink or component to be transferred having been removed from the transfer sheet, the transfer sheet can now, by appropriately placed rollers, be carried back to the compression roller used in conjunction with the first rotogravure printing cylinder. By the same token, where a continuous sheet is being decorated, it can, after receiving the decoration from the transfer sheet, be carried to a reel and rolled up.

Where the transfer sheet utilized is of an unstretchable material, such as, for example, cellulose acetate, the designs placed on the printing cylinders may be placed for extremely fine register, due to the unstretchable characteristic of the transfer sheet. It will be apparent that this results in very fine register printing on stretchable materials, such as, for example, polyvinyl chloride type resins and could not be achieved by means of printing directly onto such stretchable materials.

It will further be understood that the above examples are merely illustrative, applicant not desiring to be limited except as set forth in the claims.

What is claimed is:

1. The method of decorating a surface with a multicolor design which comprises applying a plurality of spaced printing rollers carrying registering designs each with an ink which comprises coloring material, a matrix resin which is thermoplastic and which is substantially incompatible with the transfer sheet and compatible with the surface to be decorated, said matrix resin carrying said coloring material, a flow agent having a substantially lower molecular weight than the matrix resin and having molecules whose dipoles are about equal in strength to the dipoles of the matrix resin molecules, said flow agent being miscible with said matrix resin and admixed therewith and a solvent for both the matrix resin and the flow agent which has a slight solvent action on the transfer sheet, each of said inks being of a different color; passing a continuous, firm, flexible and impermeable transfer sheet over said printing rollers and printing the registering design thereon, applying a solvent to the ink to effect a transfer thereof from the transfer sheet to the surface to be decorated, pressing the design side of the transfer sheet into intimate contact with the surface to be decorated and stripping the transfer sheet from the surface to be decorated, said transfer sheet being moved at a speed which insures substantial drying of each ink after it is printed on the transfer sheet and before the next stage of the process is carried out.

2. The method of decorating a surface with a multicolor design which comprises applying a plurality of spaced printing rollers carrying registering designs each with an ink which comprises coloring material, a matrix resin which is thermoplastic and which is substantially incompatible with the transfer sheet and compatible with the surface to be decorated, said matrix resin carrying in admixture said coloring material, a flow agent having a substantially lower molecular weight than the matrix resin and having molecules whose dipoles are about equal in strength to the dipoles of the matrix resin molecules, said flow agent being miscible with said matrix resin and admixed therewith and a solvent for both the matrix resin and the flow agent which has a slight solvent action on the transfer sheet, each of said inks being of a different color; passing a continuous, firm, flexible and impermeable transfer sheet over said printing rollers and printing the registering design thereon, coating the surface with a lacquer in emulsion form which is compatible with both the surface and the multicolor design, pressing the design into intimate contact with the thus lacquered surface and stripping the transfer sheet from the design, leaving the design secured to the surface to be decorated.

References Cited in the file of this patent

UNITED STATES PATENTS

| | | |
|---|---|---|
| 483,446 | Higgins | Sept. 27, 1892 |
| 911,327 | Pellew | Feb. 2, 1909 |
| 1,609,500 | Terlinden | Dec. 7, 1926 |
| 1,862,189 | McCarthy | June 7, 1932 |
| 1,909,631 | Poschel | May 16, 1933 |
| 1,936,080 | Boyle et al. | Nov. 21, 1933 |
| 2,094,886 | Hart | Oct. 5, 1937 |
| 2,185,983 | Humphner | Jan. 2, 1940 |
| 2,242,182 | McCann | May 13, 1941 |
| 2,350,840 | Tagliabue | June 6, 1944 |
| 2,587,594 | Chavannes et al. | Mar. 4, 1952 |

FOREIGN PATENTS

| | | |
|---|---|---|
| 614,995 | Great Britain | Dec. 30, 1948 |
| 623,479 | Great Britain | May 18, 1949 |